(12) United States Patent
Ergen et al.

(10) Patent No.: US 11,191,109 B2
(45) Date of Patent: Nov. 30, 2021

(54) METHOD AND SYSTEM FOR ESTABLISHING A CONNECTION BETWEEN A CLIENT DEVICE AND A WI-FI ACCESS POINT BASED ON PERSONALIZED SSIDS USING A CLOUD PLATFORM

(71) Applicant: Ambeent Wireless Bilişim ve Yazilim A.Ş, Istanbul (TR)

(72) Inventors: Mustafa Ergen, Istanbul (TR); Hasan Şildir, Istanbul (TR); Sinem Çöleri Ergen, Istanbul (TR)

(73) Assignee: Ambeent Inc., Istanbul (TR)

( * ) Notice: Subject to any disclaimer, the term of this patent is extended or adjusted under 35 U.S.C. 154(b) by 0 days.

(21) Appl. No.: 15/937,824

(22) Filed: Mar. 27, 2018

(65) Prior Publication Data
US 2021/0298095 A1 Sep. 23, 2021

Related U.S. Application Data

(60) Provisional application No. 62/601,535, filed on Mar. 27, 2017.

(51) Int. Cl.
| | |
|---|---|
| H04W 76/10 | (2018.01) |
| H04L 29/12 | (2006.01) |
| H04W 12/73 | (2021.01) |
| H04W 24/08 | (2009.01) |
| H04W 84/12 | (2009.01) |

(52) U.S. Cl.
CPC .......... *H04W 76/10* (2018.02); *H04L 61/20* (2013.01); *H04W 12/73* (2021.01); *H04W 24/08* (2013.01); *H04L 61/6022* (2013.01); *H04W 84/12* (2013.01)

(58) Field of Classification Search
CPC .................................................. H04W 76/10
See application file for complete search history.

(56) References Cited

U.S. PATENT DOCUMENTS

2017/0366408 A1* 12/2017 Kyllonen .............. H04L 41/12
2019/0215842 A1* 7/2019 Silverman ........... H04W 24/10

\* cited by examiner

*Primary Examiner* — Sulaiman Nooristany
(74) *Attorney, Agent, or Firm* — Farrell Patent Law PC; Mark Farrell (57) ABSTRACT

The invention provides a method and system for establishing a connection between a client device of a plurality of client devices and a Wi-Fi access point of a plurality of Wi-Fi access points using a cloud platform. To start with, the plurality of client devices and the plurality of Wi-Fi access points are registered with the cloud platform. Subsequently, the client device transmits a network demand request to one or more target Wi-Fi access points. The one or more target Wi-Fi access points receive account details containing pre-registered credentials associated with the client device from the cloud platform. Upon receiving the account details, the one or more target Wi-Fi access points authorize the client device and broadcast a personalized SSID. The client device uses the personalized SSID to access a Wi-Fi access point of the one or more target Wi-Fi access points using the pre-registered credentials.

30 Claims, 7 Drawing Sheets

METHOD AND SYSTEM FOR ESTABLISHING A CONNECTION BETWEEN A CLIENT DEVICE AND A WI-FI ACCESS POINT BASED ON PERSONALIZED SSIDS USING A CLOUD PLATFORM

FIELD OF THE INVENTION

The invention generally relates to establishing a connection between a client device of a plurality of client devices and a Wi-Fi access point of a plurality of Wi-Fi access points using a cloud platform. More specifically, the invention relates to enabling the client device to access a Wi-Fi access point of one or more target Wi-Fi access points that are within a predefined range based on a personalized service set identifier (SSID) using pre-registered credentials of the client device stored on the cloud platform.

BACKGROUND OF THE INVENTION

Wi-Fi networks are formed using one or more Wi-Fi access points that support a connection of multiple wireless client devices to a wired connection for access to the Internet. Due to huge demand, enormous number of Wi-Fi access points are deployed in places such as, but not limited to, residential spaces, apartments, office buildings and public spaces and the Wi-Fi access points are densely concentrated around certain places with high data traffic.

Traditional methods of Wi-Fi access include a login based mechanism for a particular digital subscriber line (DSL) through a network broadcasted by a typical Wi-Fi access point. In such a mechanism, the Wi-Fi access point obtains an Internet Protocol (IP) address from the operator to serve the users for connection establishment, which is applicable only when the signal from the particular Wi-Fi access point reaches the users with a predefined service set identifier (SSID) and password, which are unknown to exterior users. On the other hand, the mobility of the users and the need for data exchange have increased over the past years, increasing the need for flexible connection procedures.

In an Independent Base Station Subsystem (MSS), the SSID is chosen by a client device that starts the network, and broadcasting of the SSID is performed in a pseudo-random order by all devices that are members of the network. Thus, SSID and the corresponding password form an essential tuple in daily life to determine the interactions between users and Wi-Fi access points. However, in practice, the Wi-Fi access point host should manually share the SSID and the password tuple with the users to enable them have access to the network.

An alternative to SSID management is the media access control (MAC) authorization process. The router owner enables the connection of particular client devices defined by their MAC addresses. Thus, a password is not practically necessary to log a user with a predefined password once it is authorized. In practice, a Wi-Fi owner would share the available bandwidth with the foreign network demanders if the capacity it provides is above the total required rate of the users even though the network is in use.

When the Wi-Fi network is not occupied by the host or pre-authorized users, the Wi-Fi access points broadcast only beacons, resulting in waste of available data rate from the DSL since there is no efficient method to provide credentials to foreign users within predefined constraints. In such cases, the users may be restricted to a cellular network with lower download limit. In addition, the inefficiency in current uncoordinated Wi-Fi access point architecture results in overloading of the cellular networks due to the restrictions and challenges in signing into foreign networks. Thus, a coordination scheme is lacking and not included in practice in current Wi-Fi networks.

Therefore, in light of the above, there is a need for a method and system for providing authentication-free network login for registered users away from the home network and Wi-Fi access point sharing, and enabling significant flexibility to mobility and offloading considering the current and future demands.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to establishing a connection between a client device of a plurality of client devices and a Wi-Fi access point of a plurality of Wi-Fi access points based on personalized service set identifiers (SSIDs) using pre-registered credentials of the client device stored on a cloud platform.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for establishing a connection between a client device of a plurality of client devices and a Wi-Fi access point of a plurality of Wi-Fi access points using a cloud platform. To start with, the cloud platform registers each Wi-Fi access point of the plurality of Wi-Fi access points and each client device of the plurality of client devices. Subsequently, the client device identifies one or more target Wi-Fi access points of the plurality of Wi-Fi access points and transmits a network demand request to the one or more target Wi-Fi access points. Upon receiving the network demand request, the one or more target Wi-Fi access points transmit a request for account details associated with the client device to the cloud platform. Upon receiving the request, the cloud platform transmits account details including pre-registered credentials associated with the client device to the one or more target Wi-Fi access points. The one or more target Wi-Fi access points, upon receiving the account details, authorize the pre-registered credentials associated with the client device and in response to the authorization, the one or more target Wi-Fi access points broadcast a personalized SSID. Thereafter, the client device uses the personalized SSID to access a Wi-Fi access point of the one or more target Wi-Fi access points using the pre-registered credentials.

Figure 1:
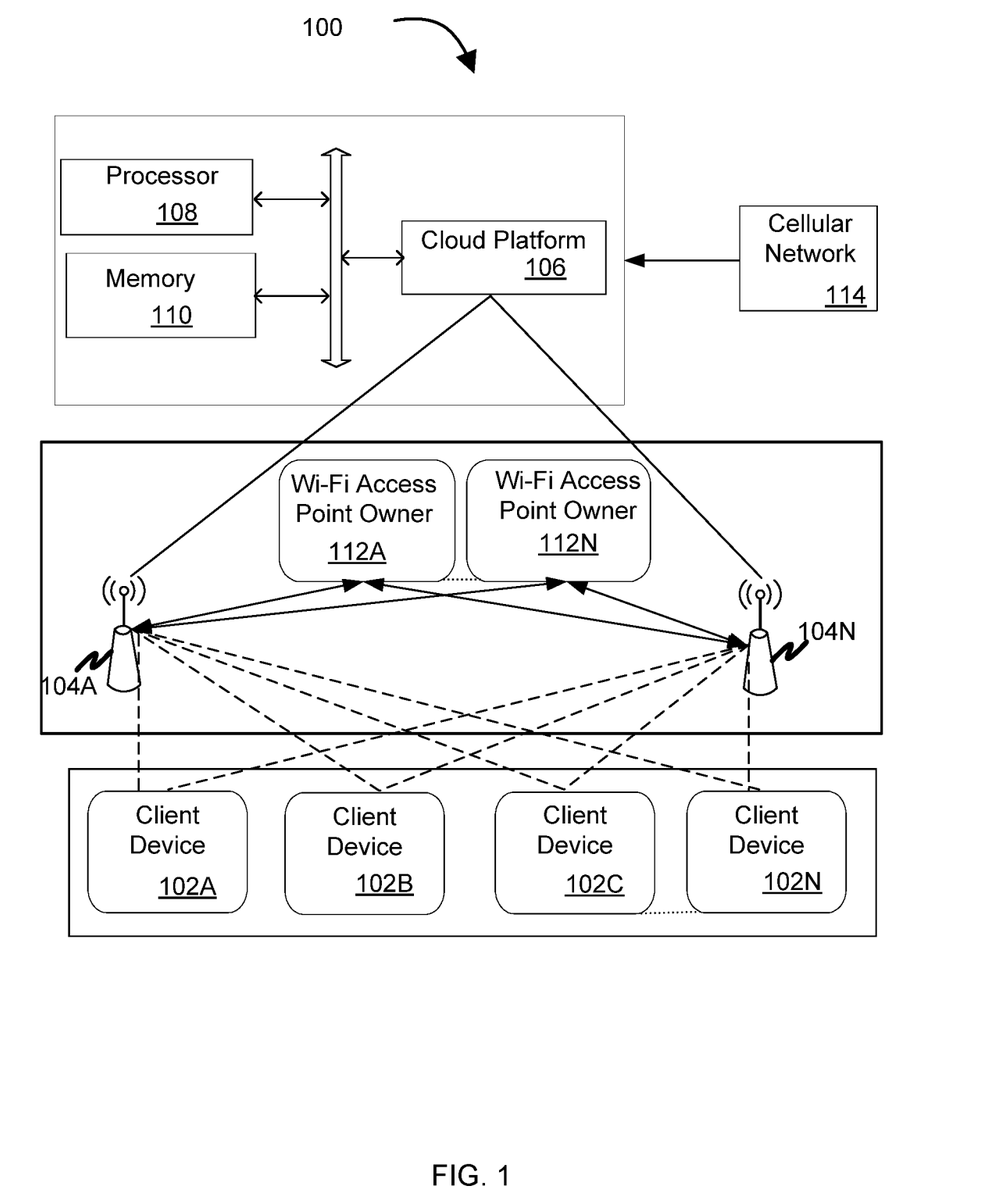
FIG. 1 illustrates a system for establishing a connection between a client device of a plurality of client devices and a Wi-Fi access point of a plurality of Wi-Fi access points using a cloud platform in accordance with an embodiment of the invention.

FIG. 1 illustrates a system 100 for establishing a connection between a client device 102A of a plurality of client devices 102A-102N and a Wi-Fi access point 104A of a plurality of Wi-Fi access points 104A-104N using a cloud platform 106 in accordance with an embodiment of the invention.

As illustrated in FIG. 1, system 100 includes plurality of client devices 102A-102N and plurality of Wi-Fi access points 104A-104N that communicate with cloud platform 106. Plurality of client devices 102A-102N are user devices such as, but not limited to, a mobile device, a personal digital assistant, a computer, a laptop, a smart phone and a tablet. Plurality of Wi-Fi access points 104A-104N are deployed in places such as, but not limited to, homes, enterprises and public spaces.

Further, cloud platform 106 is communicatively coupled to a processor 108 and a memory 110. Processor 108 is communicative coupled to memory 110.

In accordance with system 100, each client device of plurality of client devices 102A-102N and each Wi-Fi access point of plurality of Wi-Fi access points 104A-104N is registered with cloud platform 106 using processor 108.

Client device 102A is registered with cloud platform 106 through a mobile application installed on client device 102A, by providing information associated with client device 102A. The information associated with client device 102A include, but is not limited to, credentials of a Wi-Fi access point associated with client device 102A, usage preferences, media access control (MAC) address of client device 102A and credit card information of client device 102A. Subsequently, based on the information collected from client device 102A, cloud platform 106 creates an account corresponding to client device 102A. The account also includes information such as, but not limited to, historical SSIDs and corresponding passwords associated with client device 102A.

In addition to registering the credentials, the mobile application delivers network related information such as the location of the Wi-Fi access point associated with client device 102A and a maximum download speed, which are calculated or manually demanded from client device 102A. Cloud platform 106 clusters the available network data hierarchically based on the location, IEEE 802.11 protocol and other available properties to speed up the computations during the data exchange for very high number of users.

In order to register Wi-Fi access point 104A with cloud platform 106, a Wi-Fi access point owner 112A of plurality of Wi-Fi access point owners 112A-112N, shares credentials and settings associated with Wi-Fi access point 104A through a mobile application installed on a mobile device of Wi-Fi access point owner 112A.

Further, cloud platform 106 is used to remotely manage one or more Wi-Fi access points of plurality of Wi-Fi access points 104A-104N to modify one or more parameter settings associated with the one or more Wi-Fi access points based on the location of the one or more Wi-Fi access points.

Moreover, cloud platform 106 stores current SSID and maximum broadcasting capacity of the one or more Wi-Fi access points prior to the registration, in order to determine flexibility range of a Wi-Fi network by logging into a local management server of the one or more Wi-Fi access points. Once the registration process is accomplished, cloud platform 106 automatically updates the settings of the one or more Wi-Fi access points and allows cloud platform 106 to continuously monitor the connection status of the one or more Wi-Fi access points though respective internet protocol (IP) addresses. Thus, based on the current connection status of the one or more Wi-Fi access points, a recent IP address of the one or more Wi-Fi access points is updated at cloud platform 106 through a mobile application installed on the mobile device of a Wi-Fi access point owner corresponding to a Wi-Fi access point.

In order to establish a connection between client device 102A and Wi-Fi access point 104A, client device 102A identifies one or more target Wi-Fi access points of plurality of Wi-Fi access points 104A-104N for transmitting a network demand request.

In order to identify the one or more target Wi-Fi access points, in an embodiment, cloud platform 106 detects a location associated with client device 102A and a location associated each Wi-Fi access point of plurality of Wi-Fi access points 104A-104N by utilizing a cellular network 114.

Cellular network 114 detects the location of client device 102A through a base station or other means. Further, cellular network 114 detects the location of each Wi-Fi access point of plurality of Wi-Fi access points 104A-104N based on constant global positioning system (GPS) signals received by cloud platform 106. Subsequently, cloud platform 106 compares the location of plurality of Wi-Fi access points 104A-104N with the location of client device 102A and reports the availability of the one or more target Wi-Fi access points identified within the predefined range of client device 102A.

Further, the location of client device 102A is identified by using an accelerometer of a mobile device, in local computations to infer the direction and the deviation from the nominal position. The accelerometer readings are tracked on local computations to estimate future probable location ranges without cloud integration. Once there is a significant change in the position of client device 102A or in its forecasts, it uploads the current and the forecasted GPS position based on the local measurements.

In another embodiment, in order to identify the one or more target Wi-Fi access points at cloud platform 106, client device 102A detects beacon signals received from one or more Wi-Fi access points of plurality of Wi-Fi access points 104A-104N. The beacon signals include MAC addresses corresponding to the one or more Wi-Fi access points within the predefined range of client device 102A. On detecting the MAC addresses of the one or more Wi-Fi access points, client device 102A verifies the received MAC addresses with a list of MAC addresses stored in cloud platform 106 and identifies the one or more target Wi-Fi access points within the predefined range of client device 102A.

Upon identifying the one or more target Wi-Fi access points within the predefined range of client device 102A, client device 102A then initiates transmission of the network demand request to the one or more target Wi-Fi access points. The network demand request transmitted to the one or more target Wi-Fi access points includes a client device ID, a demanded connection time and a number of client devices for connection.

Upon receiving the network demand request, the one or more target Wi-Fi access points transmit a request to cloud platform 106 for extracting account details associated with client device 102A. The account details include pre-registered credentials associated with client device 102A and statistical data of client device 102A such as, but not limited to, average network usage time from previous performances, average data download from previous logins, a number of users the client device provided permission and a number of client devices.

Upon receiving the account details from cloud platform 106, the one or more target Wi-Fi access points transmit a network demand request notification to one or more Wi-Fi access point owners of plurality of Wi-Fi access point owners 112A-112N associated with the one or more target Wi-Fi access points. The network demand request notification includes the account details received from the cloud platform 106. Upon receiving the network demand request notification, the one or more Wi-Fi access point owners verify the account details and transmit a network demand approval message to the one or more target Wi-Fi access points. The network demand approval message includes a time, a maximum data rate, a maximum download quota, a maximum number of client devices and website restrictions.

Upon receiving the network demand approval message, the one or more target Wi-Fi access points authorize the pre-registered credentials associated with client device 102A received from cloud platform 106. In response to the authorization, the one or more target Wi-Fi access points broadcast a personalized SSID. The personalized SSID is an open SSID. Thereafter, client device 102A uses the personalized SSID to access Wi-Fi access point 104A of the one or more target Wi-Fi access points with the pre-registered credentials.

Further, the one or more target Wi-Fi access points constantly monitor a network performance measurement data of client device 102A and collect the network performance measurement data associated with client device 102A. Subsequently, the network performance measurement data is uploaded to cloud platform 106 by the one or more target Wi-Fi access points and a statistical analysis and performance monitoring of client device 102A is performed based on the network performance measurement data. Thereafter, a connection is established between Wi-Fi access point 104A of the one or more target Wi-Fi access points and client device 102A based on the statistical analysis. The connection established between client device 102A and Wi-Fi access point 104A may be terminated if a download from a corresponding network of client device 102A exceeds a threshold value set by a network host of the corresponding network.

Additionally, the Wi-Fi network data used by client device 102A is analyzed to charge client device 102A based on a billing policy and client device 102A is enabled to make payment using the credit card information stored in cloud platform 106. The payment made by client device 102A is shared between digital subscriber line (DSL) provider, cellular network 114 and the Wi-Fi network host for providing economic benefits.

Figure 2:
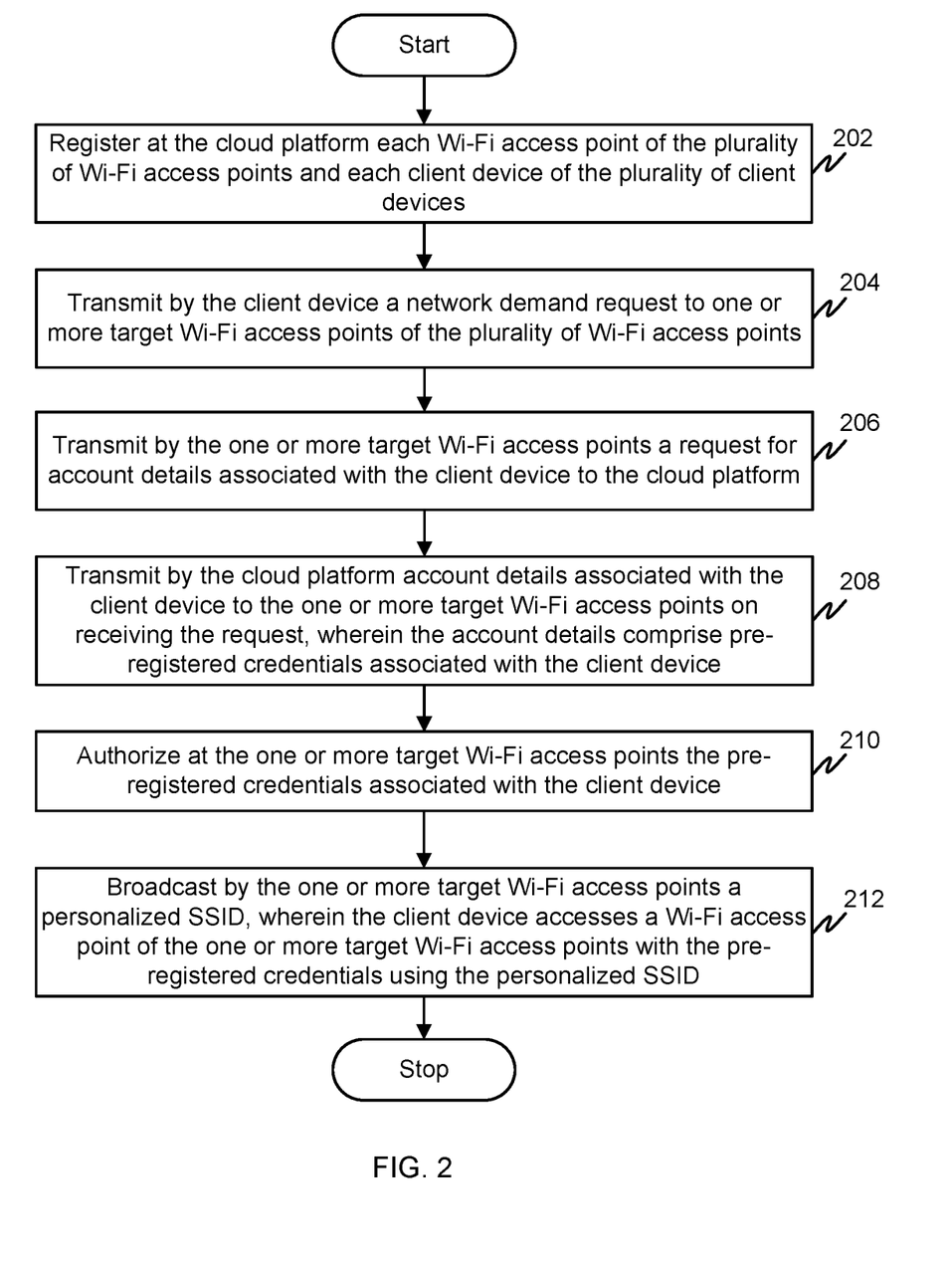
FIG. 2 illustrates a flowchart of a method for establishing a connection between a client device of a plurality of client devices and a Wi-Fi access point of a plurality of Wi-Fi access points using a cloud platform in accordance with an embodiment of the invention.

FIG. 2 illustrates a flowchart of a method for establishing a connection between client device 102A of plurality of client devices 102A-102N and Wi-Fi access point 104A of plurality of Wi-Fi access points 104A-104N using cloud platform 106 in accordance with an embodiment of the invention.

At step 202, each client device of plurality of client devices 102A-102N and each Wi-Fi access point of plurality of Wi-Fi access points 104A-104N is registered with cloud platform 106 using processor 108.

The mobile application installed on client device 102A is utilized for providing information associated with client device 102A in order to register client device 102A with cloud platform 106.

Similarly, Wi-Fi access point 104A is registered with cloud platform 106 through the mobile application installed on the mobile device of Wi-Fi access point owner 112A associated with Wi-Fi access point 104A by sharing credentials and settings associated with Wi-Fi access point 104A.

Figure 3:
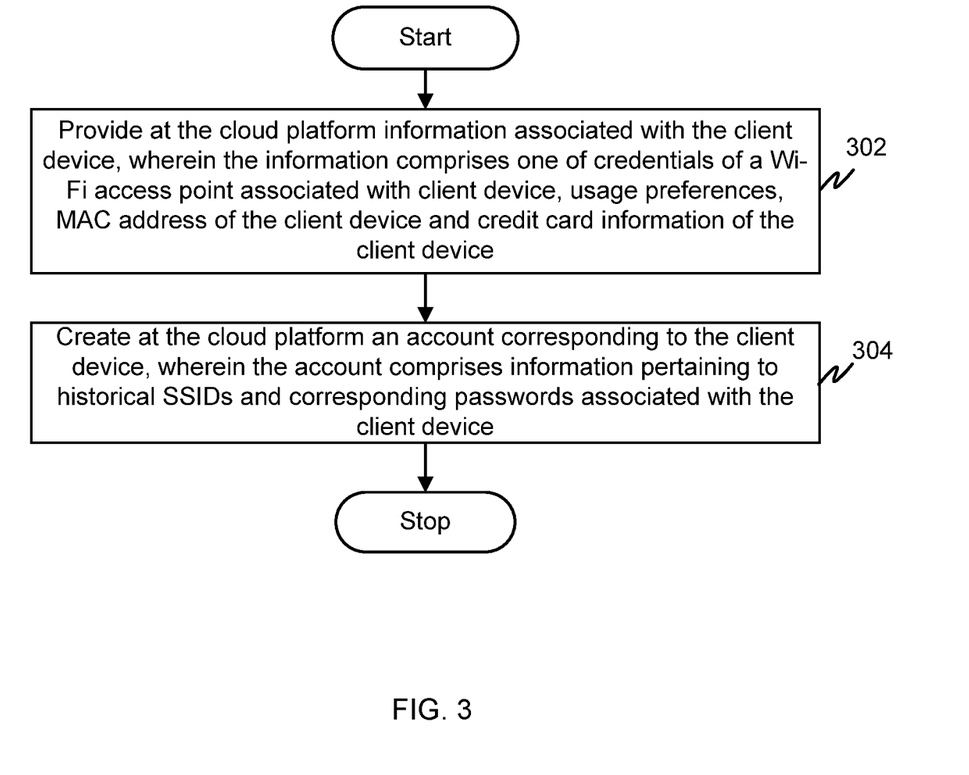
FIG. 3 illustrates a flowchart of a method for registering a client device to the cloud platform in accordance with an embodiment of the invention.

Step 202 is further described in detail in conjunction with FIG. 3.

Subsequently, at step 204, client device 102A identifies one or more target Wi-Fi access points of plurality of Wi-Fi access points 104A-104N at cloud platform 106 and transmits a network demand request to the one or more target Wi-Fi access points. Step 204 is further described in detail in conjunction with FIG. 4 and FIG. 5.

Upon receiving the network demand request, at step 206, the one or more target Wi-Fi access points transmit a request to cloud platform 106 for extracting account details associated with client device 102A. In an ensuing step 208, cloud platform 106 transmits the account details associated with client device 102A to the one or more target Wi-Fi access points. The account details include pre-registered credentials associated with client device 102A.

Subsequently, at step 210, the one or more target Wi-Fi access points authorize the pre-registered credentials associated with client device 102A. Step 210 is further described in detail in conjunction with FIG. 6.

Thereafter, in response to the authorization, at step 212, the one or more target Wi-Fi access points broadcast a personalized SSID and client device 102A accesses Wi-Fi access point 104A of the one or more target Wi-Fi access points with the pre-registered credentials using the personalized SSID.

FIG. 3 illustrates a flowchart of a method for registering client device 102A at cloud platform 106 in accordance with an embodiment of the invention.

At step 302, client device 102A is registered at cloud platform 106 by providing information associated with client device 102A. The information associated with client device 102A includes credentials of a Wi-Fi access point associated with client device 102A, usage preferences, MAC address of client device 102A and credit card information of client device 102A.

Subsequently, at step 304, cloud platform 106 creates an account corresponding to client device 102A based on the information collected from client device 102A. The account also includes information pertaining to the historical SSIDs and corresponding passwords associated with client device 102A.

Figure 4:
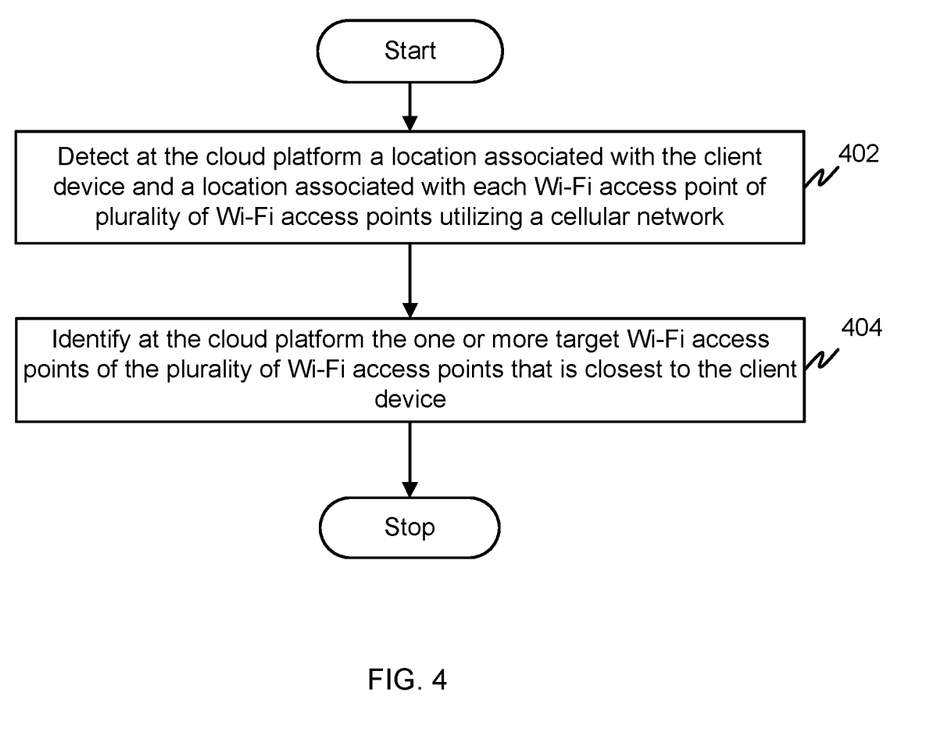
FIG. 4 illustrates a flowchart of a method for identifying one or more target Wi-Fi access points at the cloud platform in accordance with an embodiment of the invention, wherein the one or more target Wi-Fi access points are identified utilizing a cellular network.

FIG. 4 illustrates a flowchart of a method for identifying the one or more target Wi-Fi access points at cloud platform 106 in accordance with an embodiment of the invention, wherein the one or more target Wi-Fi access points are identified utilizing cellular network 114.

At step 402, cloud platform 106 detects a location associated with client device 102A and a location associated with each Wi-Fi access points of plurality of Wi-Fi access points 104A-104N using cellular network 114.

Cellular network 114 detects the location of client device 102A through a base station or other means. Further, cellular network 114 detects the location of each Wi-Fi access point of plurality of Wi-Fi access points 104A-104N based on constant global position system (GPS) signals received by cloud platform 106.

Subsequently, at step 404, cloud platform 106 compares the location of plurality of Wi-Fi access points 104A-104N with the location of client device 102A and identifies the one or more target Wi-Fi access points within the predefined range of client device 102A.

Figure 5:
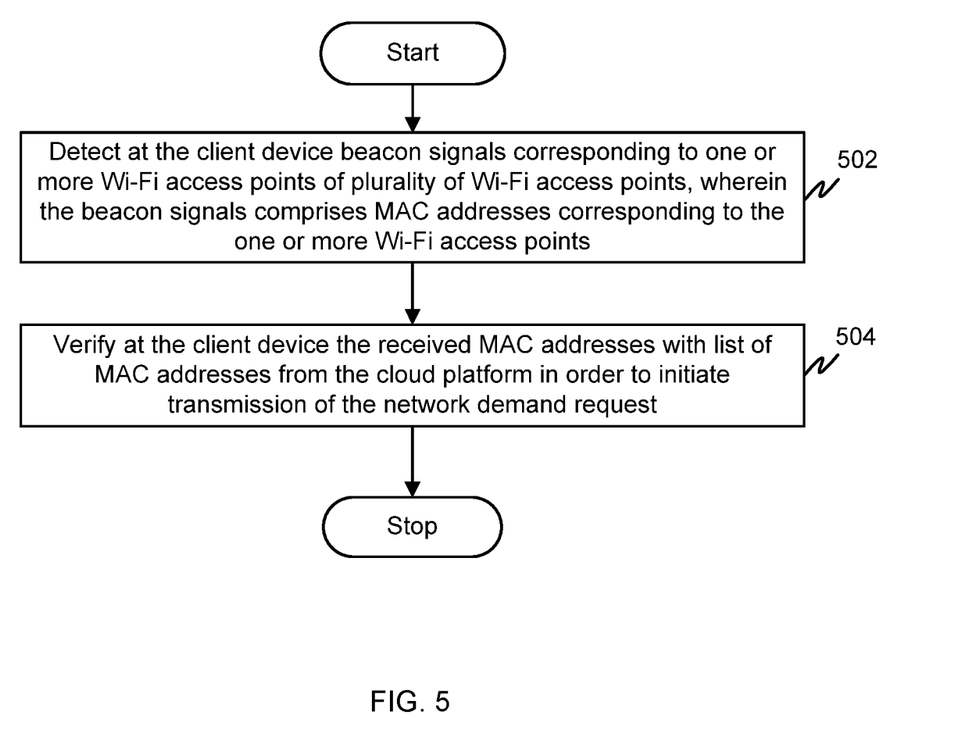
FIG. 5 illustrates a flowchart of a method for identifying one or more target Wi-Fi access points at the cloud platform in accordance with another embodiment of the invention, wherein the one or more target Wi-Fi access points are identified utilizing MAC addresses.

FIG. 5 illustrates a flowchart of a method for identifying the one or more target Wi-Fi access points at cloud platform 106 in accordance with another embodiment of the invention, wherein the one or more target Wi-Fi access points are identified utilizing MAC addresses.

At step 502, client device 102A detects beacon signals received from one or more Wi-Fi access points of plurality of Wi-Fi access points 104A-104N. The beacon signals include MAC addresses corresponding to the one or more Wi-Fi access points within the predefined range of client device 102A.

On detecting the MAC addresses of the one or more Wi-Fi access points, at step 504, client device 102A verifies the received MAC addresses with a list of MAC addresses stored in cloud platform 106 for identifying the one or more target Wi-Fi access points.

Figure 6:
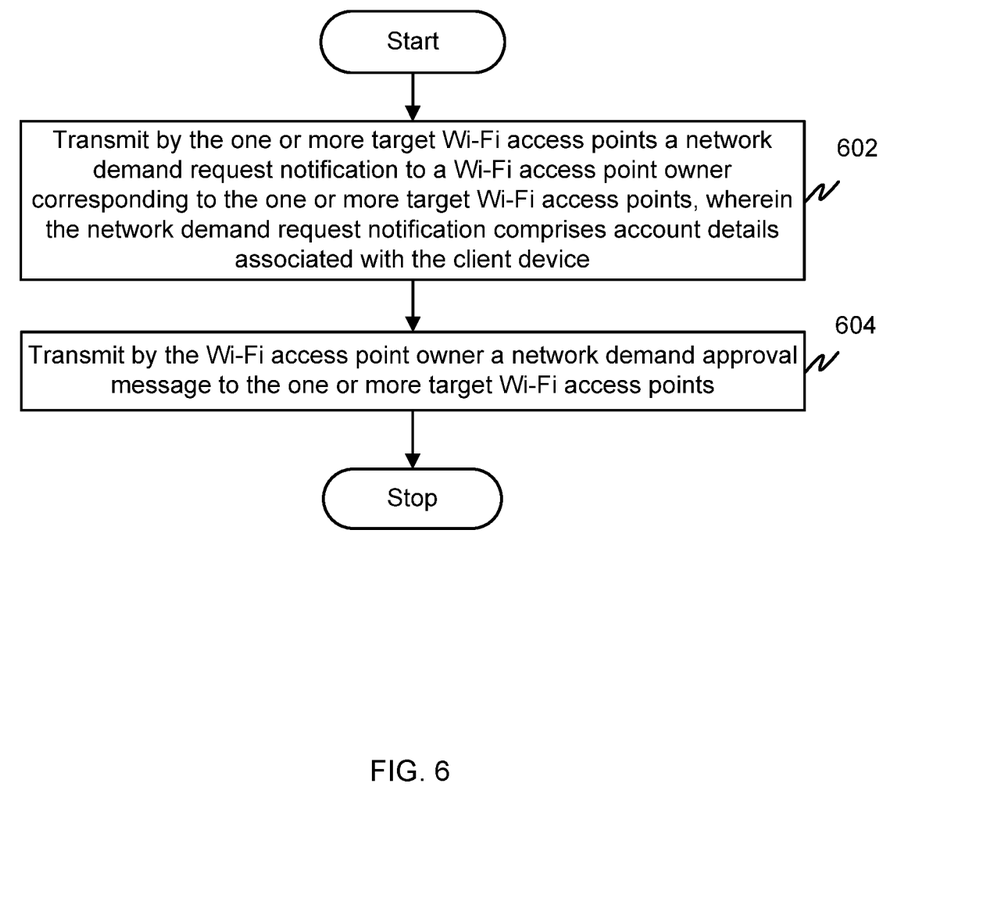
FIG. 6 illustrates a flowchart of a method for authorizing a client device at the one or more target Wi-Fi access points in accordance with an embodiment of the invention.

FIG. 6 illustrates a flowchart of a method for authorizing client device 102A at the one or more target Wi-Fi access points in accordance with an embodiment of the invention.

At step 602, the one or more target Wi-Fi access points transmit a network demand request notification to one or more Wi-Fi access point owners of plurality of Wi-Fi access point owners 112A-112N associated with the one or more target Wi-Fi access points. The network demand request notification includes account details associated with client device 102A.

Upon receiving the network demand request notification, the one or more Wi-Fi access point owners verify the account details associated with client device 102A and at step 604, transmit a network demand approval message to the one or more target Wi-Fi access points.

Figure 7:
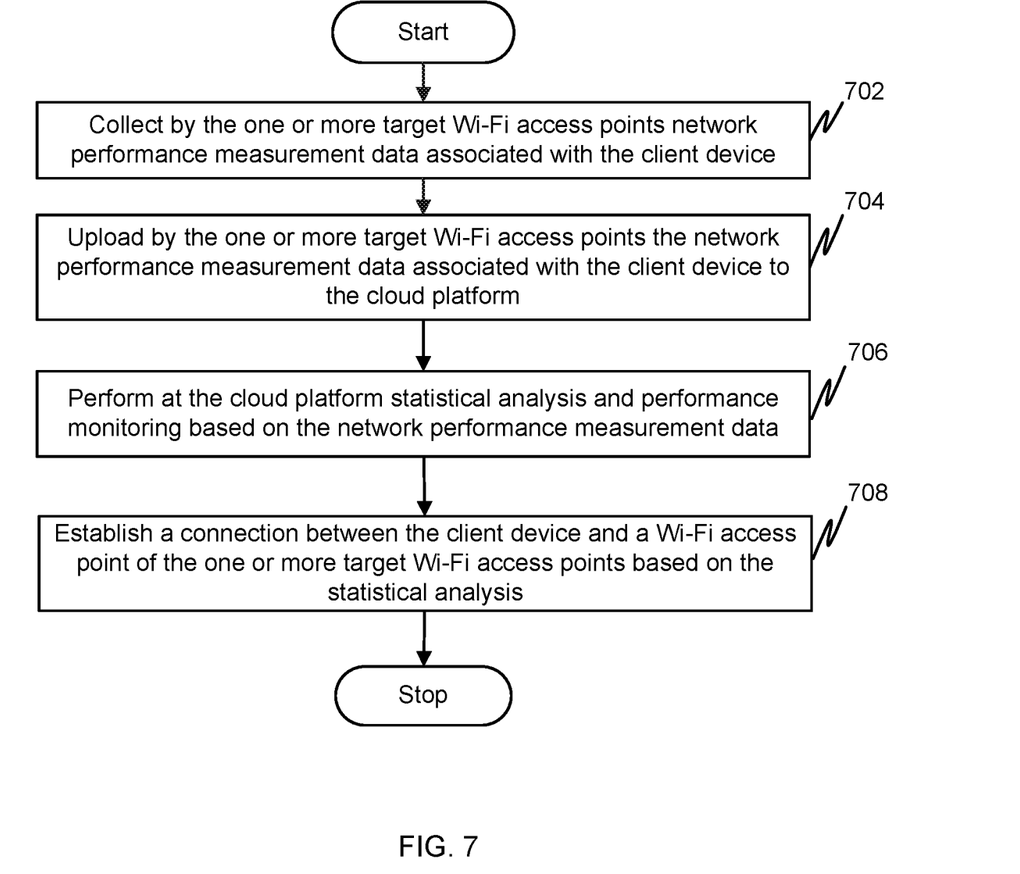
FIG. 7 illustrates a flowchart of a method for establishing a connection between a client device and a Wi-Fi access point of the one or more target Wi-Fi access points based on statistical analysis in accordance with an embodiment of the invention.

FIG. 7 illustrates a flowchart of a method for establishing a connection between client device 102A and Wi-Fi access point 104A of the one or more target Wi-Fi access points based on statistical analysis in accordance with an embodiment of the invention.

At step 702, the one or more target Wi-Fi access points constantly monitors a network performance measurement data of client device 102A and collect the network performance measurement data associated with client device 102A. Subsequently, at step 704, the network performance measurement data associated with client device 102A is uploaded to cloud platform 106 by the one or more target Wi-Fi access points.

In an ensuing step 706, cloud platform 106 performs statistical analysis and performance monitoring of client device 102A based on the network performance measurement data. Thereafter, at step 708, a connection is established between client device 102A and Wi-Fi access point 104A of the one or more target Wi-Fi access points based on the statistical analysis. The connection established between client device 102A and Wi-Fi access point 104A may be terminated if a download from a corresponding network of client device 102A exceeds a threshold value set by a network host of the corresponding network.

The invention provides additional control mechanism over data planes through remote control mechanism by integration of various layers such as, mobile application, cloud platform and traditional network elements. The mobile application can get/set the operating parameters of the one or more Wi-Fi access points with full functionality and also broadcast networks with different SSIDs within a predefined and adjustable set of constraints.

Further, the cloud platform is capable of changing parameters of Wi-Fi access points remotely based on the credentials and settings provided to the cloud platform during the registration process by Wi-Fi access point owners associated with the Wi-Fi access points. At a particular time, the mobile application installed on the mobile device of the Wi-Fi access point owners reports the Wi-Fi access points within the predefined range of the client device to the cloud platform, which modifies the availability of the Wi-Fi access points to broadcast private networks with familiar SSIDs with the permission of a Wi-Fi network host associated with the Wi-Fi network.

Also, the invention provides the possibility of authentication free network login for registered devices away from home network and Wi-Fi access point sharing. Support of high mobility and better resource utilization through the exploitation of interactions of the cloud platform and cellular operator results in efficiency and improvement of Wi-Fi management. The interactions also enable charging the client device for the services used using the online account, thus increasing the cellular network efficiency.

Thus, the invention establishes a world-wide connection of network elements in order to increase efficiency in mobility and offloading performance.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for establishing a connection between a client device of a plurality of client devices and a Wi-Fi access point of a plurality of Wi-Fi access points using a cloud platform, the method comprising:
    registering, at the cloud platform, each Wi-Fi access point of the plurality of Wi-Fi access points and each client device of the plurality of client devices;
    transmitting, by the client device, a network demand request to at least one target Wi-Fi access point of the plurality of Wi-Fi access points;
    transmitting, by the at least one target Wi-Fi access point, a request for account details associated with the client device to the cloud platform;
    on receiving the request, transmitting, by the cloud platform, account details associated with the client device to the at least one target Wi-Fi access point, wherein the account details comprise pre-registered credentials associated with the client device;
    authorizing, at the at least one target Wi-Fi access point, the pre-registered credentials associated with the client device; and
    in response to the authorization, broadcasting, by the at least one target Wi-Fi access point, a personalized SSID, wherein the client device accesses a Wi-Fi access point of the at least one target Wi-Fi access point with the pre-registered credentials using the personalized SSID;
    wherein the authorizing comprises:
    transmitting, by the at least one target Wi-Fi access point, a network demand request notification to a Wi-Fi access point owner corresponding to the at least one target Wi-Fi access point, wherein the network demand request notification comprises account details associated with the client device; and
    transmitting, by the Wi-Fi access point owner, a network demand approval message to the at least one target Wi-Fi access point;
    wherein the network demand approval message comprises a time, a maximum data rate, a maximum download quota, a maximum number of client devices and website restrictions.

2. The method according to claim 1, wherein the registering of a client device is done through a mobile application installed on the client device.

3. The method according to claim 2, wherein the registering of a client device comprises:
    providing, at the cloud platform, information associated with the client device, wherein the information comprises one of credentials of a Wi-Fi access point associated with client device, usage preferences, MAC address of the client device and credit card information of the client device; and
    creating, at the cloud platform, an account corresponding to the client device, wherein the account comprises information pertaining to historical SSIDs and corresponding passwords associated with the client device.

4. The method according to claim 1, wherein the registering of a Wi-Fi access point is done by a Wi-Fi access point owner sharing credentials and settings associated with the Wi-Fi access point using the mobile application installed on the mobile device of the Wi-Fi access point owner.

5. The method according to claim 1, wherein the cloud platform remotely manages at least one Wi-Fi access point of the plurality of Wi-Fi access points registered with the cloud platform, wherein the managing comprises modifying at least one parameter setting associated with the at least one Wi-Fi access point.

6. The method according to claim 1, wherein transmitting the network demand request comprises identifying, at the cloud platform, the at least one target Wi-Fi access point.

7. The method according to claim 6, wherein identifying the at least one target Wi-Fi access point at the cloud platform comprises:
    detecting, at the cloud platform, a location associated with the client device and a location associated with each Wi-Fi access point of the plurality of Wi-Fi access points utilizing a cellular network; and
    identifying, at the cloud platform, the at least one target Wi-Fi access point of the plurality of Wi-Fi access points that is closest to the client device.

8. The method according to claim 6, wherein identifying the at least one target Wi-Fi access point at the cloud platform comprises:
    detecting, at the client device, beacon signals corresponding to at least one Wi-Fi access point of the plurality of Wi-Fi access points, wherein the beacon signals comprise MAC addresses corresponding to the at least one Wi-Fi access point; and
    on detecting the MAC addresses, verifying, at the client device, the received MAC addresses with a list of MAC addresses from the cloud platform in order to initiate transmission of the network demand request.

9. The method according to claim 1, wherein a network demand request comprises a client device ID, a demanded connection time and a number of client devices for connection.

10. The method according to claim 1, wherein account details corresponding to a client device further comprise statistics such as an average network usage time from previous performances, average data download from previous logins, a number of users the client device provided permission and a number of client devices.

11. The method according to claim 1, wherein the authorizing comprises authorizing, at the at least one target Wi-Fi access point, a MAC address associated with the client device.

12. The method according to claim 1, wherein the broadcasting comprises broadcasting, by the at least one Wi-Fi access point, the personalized SSID when a location corresponding to the at least one Wi-Fi access point is within a predefined distance of the client device.

13. The method according to claim 1, wherein a personalized SSID is an Open SSID.

14. The method according to claim 1 further comprises:
collecting, by the at least one target Wi-Fi access point, network performance measurement data associated with the client device;
uploading, by the at least one target Wi-Fi access point, the network performance measurement data associated with the client device to the cloud platform;
performing, at the cloud platform, statistical analysis and performance monitoring based on the network performance measurement data; and
establishing a connection between the client device and a Wi-Fi access point of the at least one target Wi-Fi access point based on the statistical analysis.

15. The method according to claim 14, wherein establishing the connection comprises terminating the connection between the client device and the Wi-Fi access point if a download from a corresponding network of the client device exceeds a threshold value set by a network host of the corresponding network.

16. The method according to claim 1 further comprises charging the client device for internet access based on a billing policy using the credit card information associated with the client device, wherein a payment made by the client device is shared between a digital subscriber line (DSL) provider, a cellular network and a network host.

17. A system for establishing a connection between a client device of a plurality of client devices and a Wi-Fi access point of a plurality of Wi-Fi access points using a cloud platform, the system comprising:
a memory;
a processor communicatively coupled to the memory, wherein the processor is configured to:
register, at the cloud platform, each Wi-Fi access point of the plurality of Wi-Fi access points and each client device of the plurality of client devices;
transmit, by the client device, a network demand request to at least one target Wi-Fi access point of the plurality of Wi-Fi access points;
transmit, by the at least one target Wi-Fi access point, a request for account details associated with the client device to the cloud platform;
on receiving the request, transmit, by the cloud platform, account details associated with the client device to the at least one target Wi-Fi access point, wherein the account details comprise pre-registered credentials associated with the client device;
authorize, at the at least one target Wi-Fi access point, the pre-registered credentials associated with the client device;
in response to the authorization, broadcast, by the at least one target Wi-Fi access point, a personalized SSID, wherein the client device accesses a Wi-Fi access point of the at least one target Wi-Fi access point with the pre-registered credentials using the personalized SSID;
wherein the authorizing comprises:
transmitting, by the at least one target Wi-Fi access point, a network demand request notification to a Wi-Fi access point owner corresponding to the at least one target Wi-Fi access point, wherein the network demand request notification comprises account details associated with the client device; and
transmitting, by the Wi-Fi access point owner, a network demand approval message to the at least one target Wi-Fi access point;
wherein the network demand approval message comprises a time, a maximum data rate, a maximum download quota, a maximum number of client devices and website restrictions.

18. The system according to claim 17, wherein the processor is configured to register a client device through a mobile application installed on the client device.

19. The system according to claim 18, wherein the processor is configured to:
provide, at the cloud platform, information associated with the client device, wherein the information comprises one of credentials of a Wi-Fi access point associated with client device, usage preferences, MAC address of the client device and credit card information of the client device; and
create, at the cloud platform, an account corresponding to the client device, wherein the account comprises information pertaining to historical SSIDs and corresponding passwords associated with the client device.

20. The system according to claim 17, wherein the processor is configured to register a Wi-Fi access point by a Wi-Fi access point owner sharing credentials and settings associated with the Wi-Fi access point using the mobile application installed on the mobile device of the Wi-Fi access point owner.

21. The system according to claim 17, wherein the cloud platform remotely manages at least one Wi-Fi access point of the plurality of Wi-Fi access points registered with the cloud platform, wherein the managing comprises modifying at least one parameter setting associated with the at least one Wi-Fi access point.

22. The system according to claim 17, wherein the processor is configured to identify, at the cloud platform, the at least one target Wi-Fi access point.

23. The system according to claim 22, wherein the processor is configured to:
detect, at the cloud platform, a location associated with the client device and a location associated with each Wi-Fi access point of the plurality of Wi-Fi access points utilizing a cellular network; and
identify, at the cloud platform, the at least one target Wi-Fi access point of the plurality of Wi-Fi access points that is closest to the client device.

24. The system according to claim 22, wherein the processor is configured to:
detect, at the client device, beacon signals corresponding to at least one Wi-Fi access point of the plurality of Wi-Fi access points, wherein the beacon signals comprise MAC addresses corresponding to the at least one Wi-Fi access point; and
on detecting the MAC addresses, verify, at the client device, the received MAC addresses with a list of MAC addresses from the cloud platform in order to initiate transmission of the network demand request.

25. The system according to claim 17, wherein the processor is configured to:
   transmit, by the at least one target Wi-Fi access point, a network demand request notification to a Wi-Fi access point owner corresponding to the at least one target Wi-Fi access point, wherein the network demand request notification comprises account details associated with the client device; and
   transmit, by the Wi-Fi access point owner, a network demand approval message to the at least one target Wi-Fi access point.

26. The system according to claim 17, wherein the processor is configured to authorize, at the at least one target Wi-Fi access point, the MAC address associated with the client device.

27. The system according to claim 15, wherein the processor is configured to broadcast, by the at least one Wi-Fi access point, the personalized SSID when a location corresponding to the at least one Wi-Fi access point is within a predefined distance of the client device.

28. The system according to claim 17, wherein the processor is further configured to:
   collect, by the at least one target Wi-Fi access point, network performance measurement data associated with the client device;
   upload, by the at least one target Wi-Fi access point, the network performance measurement data associated with the client device to the cloud platform;
   perform, at the cloud platform, statistical analysis and performance monitoring based on the network performance measurement data; and
   establish a connection between the client device and a Wi-Fi access point of the at least one target Wi-Fi access point based on the statistical analysis.

29. The system according to claim 28, wherein the processor is configured to terminate the connection between the client device and the Wi-Fi access point if a download from a corresponding network of the client device exceeds a threshold value set by a network host of the corresponding network.

30. The system according to claim 17, wherein the processor is further configured to charge the client device for internet access based on a billing policy using the credit card information associated with the client device, wherein a payment made by the client device is shared between a digital subscriber line (DSL) provider, a cellular network and a network host.

* * * * *